(12) United States Patent
Garrood et al.

(10) Patent No.: US 11,035,874 B2
(45) Date of Patent: Jun. 15, 2021

(54) AIRFLOW MEASUREMENT DEVICE

(71) Applicants: Barnaby Garrood, Guildford (GB); John Buckley, Guildford (GB)

(72) Inventors: Barnaby Garrood, Guildford (GB); John Buckley, Guildford (GB)

(*) Notice: Subject to any disclaimer, the term of this patent is extended or adjusted under 35 U.S.C. 154(b) by 0 days.

(21) Appl. No.: 16/648,856

(22) PCT Filed: Sep. 17, 2018

(86) PCT No.: PCT/GB2018/052645
§ 371 (c)(1),
(2) Date: Mar. 19, 2020

(87) PCT Pub. No.: WO2019/058103
PCT Pub. Date: Mar. 28, 2019

(65) Prior Publication Data
US 2020/0249252 A1  Aug. 6, 2020

(30) Foreign Application Priority Data
Sep. 22, 2017 (GB) .................................. 1715313

(51) Int. Cl.
*G01P 13/00* (2006.01)
*G01P 13/02* (2006.01)
(Continued)

(52) U.S. Cl.
CPC .......... *G01P 13/0066* (2013.01); *G01P 5/14* (2013.01); *G01P 13/025* (2013.01); *G01P 13/045* (2013.01)

(58) Field of Classification Search
CPC . G01F 1/34; G01F 1/46; G01F 1/6845; G01F 1/662; G01F 1/68; G01F 1/684;
(Continued)

(56) References Cited

U.S. PATENT DOCUMENTS 4,843,880 A    7/1989 Sommer
6,928,884 B1 * 8/2005 Pearson .................. G01F 1/46
                                              73/861.42
(Continued)

FOREIGN PATENT DOCUMENTS

EP    1840578 A2   10/2007
EP    3112878 A1    1/2017
(Continued)

OTHER PUBLICATIONS

Great Britain Patent Application No. 1715313.1; Combined Search and Examination Report; dated Nov. 1, 2017; 6 pages.
(Continued)

*Primary Examiner* — Andre J Allen
(74) *Attorney, Agent, or Firm* — Middleton Reutlinger

(57) ABSTRACT

An airflow measurement device for use in measurement of dynamic pressure of an airflow comprises a channel having an inlet region for receiving the airflow, the inlet region being shaped to direct received airflow in a longitudinal direction with respect to the channel. The airflow measurement device further comprises one or more pressure measurement orifices positioned for measurement of pressure of at least part of the airflow after the airflow has been directed, by the inlet region of the channel, in a longitudinal direction with respect to the channel; and a plurality of further pressure measurement orifices located on an internal surface of the inlet region of the channel, wherein the plurality of further pressure measurement orifices are positioned for measurement of a direction of the received airflow.

19 Claims, 3 Drawing Sheets

(51) Int. Cl.
*G01P 13/04* (2006.01)
*G01P 5/14* (2006.01)

(58) Field of Classification Search
CPC .......... G01F 1/6842; G01F 1/76; G01F 15/00;
G01F 15/14; G01F 1/005; G01F 1/666;
G01F 1/667; G01F 1/6884; G01F 1/692;
G01F 1/696; G01F 1/698; G01F 23/00;
G01L 11/00; G01P 13/025; G01P
13/0066; G01P 13/045; G01P 5/02; G01P
5/14; G01P 5/16; G01P 13/02; G01P
5/12; G01P 5/165; G01P 5/20; G01P
5/001; G01P 5/06; G01P 5/26; G01P
13/0093; G01P 5/00; G01P 5/245; G01P
13/002; G01P 5/005; G01P 5/04; G01P
5/10; G01P 5/24; G01P 13/00; G01P
13/0006; G01P 13/0033; G01P 13/006;
G01P 13/0073; G01P 21/025; G01P 5/07;
G01P 5/175; G01P 5/18; G01P 5/247;
G01P 7/00; F03D 17/00; F03D 80/00;
F03D 80/40; F03D 7/00; F03D 7/02;
F03D 7/048; F03D 80/50; F03D 80/80;
F03D 80/85; F03D 9/25
USPC .......................................... 73/170.02–170.15
See application file for complete search history.

(56) References Cited

U.S. PATENT DOCUMENTS

| | | | | |
|---|---|---|---|---|
| 9,696,187 | B2 * | 7/2017 | Whalen | ..................... G01F 1/34 |
| 2005/0011285 | A1 | 1/2005 | Giterman | |
| 2013/0139584 | A1 * | 6/2013 | Qasimi | ..................... G01F 5/00 |
| | | | | 73/204.21 |
| 2013/0145836 | A1 | 6/2013 | Mandle | |
| 2015/0019022 | A1 * | 1/2015 | Karamanos | .......... G05D 7/0647 |
| | | | | 700/276 |
| 2016/0223579 | A1 | 8/2016 | Froemel et al. | |

FOREIGN PATENT DOCUMENTS

| | | |
|---|---|---|
| GB | 2558709 B | 2/2019 |
| JP | S52-052679 A | 4/1977 |
| JP | H02-201119 A | 8/1990 |
| JP | 2007-093321 A | 4/2007 |

OTHER PUBLICATIONS

International Patent Application No. PCT/GB2018/052645; Int'l Search Report and the Written Opinion; dated Nov. 19, 2018; 14 pages.

Japan Patent Office, Office Action issued in Application No. 2020-518611, 3 pages, dated Dec. 28, 2020.

* cited by examiner

AIRFLOW MEASUREMENT DEVICE

CROSS-REFERENCE TO RELATED APPLICATIONS

This application is the U. S. National Stage Application of International Patent Application No. PCT/GB2018/052645, filed Sep. 17, 2018 which claims the benefit of Great Britain Patent Application No. 1715313.1, filed Sep. 22, 2017, which are hereby incorporated by reference in their entireties.

FIELD

This specification relates to airflow measurement devices.

BACKGROUND

Traditional forms of anemometer are well known for measuring wind speed. However known anemometers may be unsuitable for some applications, e.g. due to their size and/or a requirement for moving parts.

SUMMARY

This specification describes an airflow measurement device for use in measurement of dynamic pressure and direction of an airflow. The device comprises a channel having an inlet region for receiving an airflow, the inlet region being shaped to direct received airflow in a longitudinal direction with respect to the channel. The device includes one or more pressure measurement orifices positioned for measurement of pressure of at least part of the airflow after the airflow has been directed, by the inlet region of the channel, in a longitudinal direction with respect to the channel. The device also includes a plurality of further pressure measurement orifices. The plurality of further pressure measurement orifices are located on an internal surface of the inlet region of the channel and are positioned for measurement of the direction of the received airflow.

In this way a compact airflow measurement device can be provided which has no moving parts, and which can be used for measurement of dynamic pressure and direction of the received airflow.

In some embodiments the device can be used for measurement of speed and direction of the received airflow. In some example implementations the device may be suitable for measuring speed and direction of low speed airflow, e.g. as experienced by the rider of a bicycle.

The inlet region may comprise a curved surface adapted to receive an airflow and turn the received airflow such that it is directed along the longitudinal axis of the channel. A pressure measurement orifice may be located adjacent to or within the longitudinally-directed airflow.

In some embodiments a pressure measurement orifice is configured for total pressure measurement. The total pressure measurement orifice may comprise an opening disposed in a plane generally perpendicularly to the longitudinal direction of the channel. In various embodiments a pressure measurement orifice may be positioned either centrally or off-centre within the channel.

In some implementations, a pressure measurement orifice of the device is configured for measurement of static pressure. In some embodiments the device may include two ro or more pressure measurement orifices, e.g. one or more pressure measurement orifices configured for total pressure measurement, and one or more pressure measurement orifices for static pressure measurement.

The device may include one or more pressure sensors, for example one or more pressure transducers. For example the device may include two pressure sensors, e.g. two differential pressure transducers. Each pressure sensor may be in fluid communication with at least one pressure measurement orifice and/or at least one further pressure measurement orifice.

One or more processors may be configured to receive data derived from the one or more pressure sensors. A computer-readable storage medium may be provided which comprises instructions which, when executed by the one or more processors, causes the one or more processors to process data derived from said one or more pressure sensors to determine a value for dynamic pressure of the received airflow. In some embodiments, the one or more processors may additionally determine values for the speed and/or direction of the received airflow.

In some embodiments, the one or more processors may be configured to calculate a drag coefficient using the measured value of dynamic pressure. As will be understood by those skilled in the art, drag coefficient may be calculated as drag force divided by dynamic pressure.

In some embodiments the one or more processors and the computer readable storage medium may form part of the device itself. In other examples the one or more processors and the computer readable storage medium may form part of another device, e.g. a user device such as a smartphone. The device may include a wireless communication unit adapted for wirelessly transmitting measured data to a user device for processing and/or storage and/or display.

In some embodiments the plurality of further pressure measurement orifices include first and second further pressure measurement orifices located at opposite sides of the inlet region. In one embodiment the plurality of further pressure measurement orifices include three or more further pressure measurement orifices arranged around the internal surface of the inlet region of the channel.

In some embodiments the inlet region of the channel defines a substantially rectangular opening. However alternatively the device may comprise an axisymmetric body defining the channel.

The inlet region of the channel may be shaped to direct the airflow in a longitudinal direction with respect to the channel without loss in total pressure, or without substantial loss in total pressure, if the angle that the received airflow makes with the longitudinal axis of the channel is less than a design onset angle. The design onset angle may be at least +/−45 degrees with respect to the longitudinal axis of the channel. However in some embodiments, the design onset angle may be much smaller, in order to obtain greater measurement resolution over that smaller angle range.

In some embodiments the device further comprises a gauge pressure sensor. The gauge pressure sensor may be in fluid communication with a pressure measurement orifice configured for total pressure measurement, so as to provide an absolute measure of total pressure. Alternatively, the gauge pressure sensor may be in fluid communication with a pressure measurement orifice configured for static pressure measurement, so as to provide an absolute measure of static pressure.

In some embodiments, the device further comprises a temperature sensor. Air density may be calculated accurately using the measured ambient temperature and ambient static pressure.

In some examples the device is a bicycle airflow measurement device which can be mounted on a bicycle for use in measuring the dynamic pressure of the oncoming airflow when the bicycle is moving. In some embodiments the speed and/or direction of the oncoming airflow may also be measured. This specification also describes a bicycle power meter comprising the device.

Although some embodiments relate to airflow measurement, in some embodiments other fluid flows (such as a flow of water) may be measured. Accordingly, in one aspect a device for use in measurement of at least one of speed, direction, and dynamic pressure of a fluid flow is provided. The fluid flow may be an airflow, a flow or water, or a flow of another liquid or gas. The device comprises a channel having an inlet region for receiving a flow, the inlet region being shaped to direct received flow in a longitudinal direction with respect to the channel. The device includes one or more pressure measurement orifices positioned for measurement of a pressure after the flow has been directed, by the inlet region of the channel, in a longitudinal direction with respect to the channel. The device also includes a plurality of further pressure measurement orifices. The plurality of further pressure measurement orifices are located on an internal surface of the inlet region of the channel and are positioned for measurement of the direction of the received flow.

So that the invention may be more easily understood, embodiments thereof will now be described by way of example only, with reference to the accompanying drawings, in which:

BRIEF DESCRIPTION OF THE DRAWINGS

Like reference numerals designate like elements throughout the specification.

DETAILED DESCRIPTION

Figure 1A:
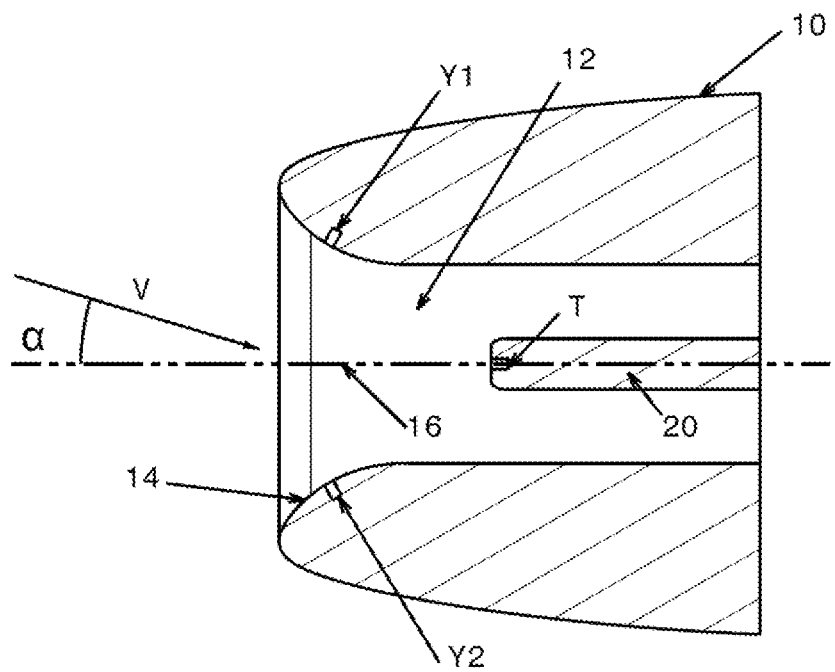
FIG. 1(a) is a sectional view of a device in accordance with a first embodiment.

FIG. 1(a) shows a device 10 for measuring dynamic pressure of an airflow in accordance with one example embodiment. The device comprises a channel 12 having an inlet region 14. The inlet region 14 has a curved surface designed to turn the received flow onto an axis 16 of the device. The inlet region 14 is shaped to turn the flow without loss in total pressure up to some angle of the onset flow (the "design onset angle") relative to that axis 16; typically the design onset angle is at least +/−45 degrees relative to the device axis 16.

Figure 1B:
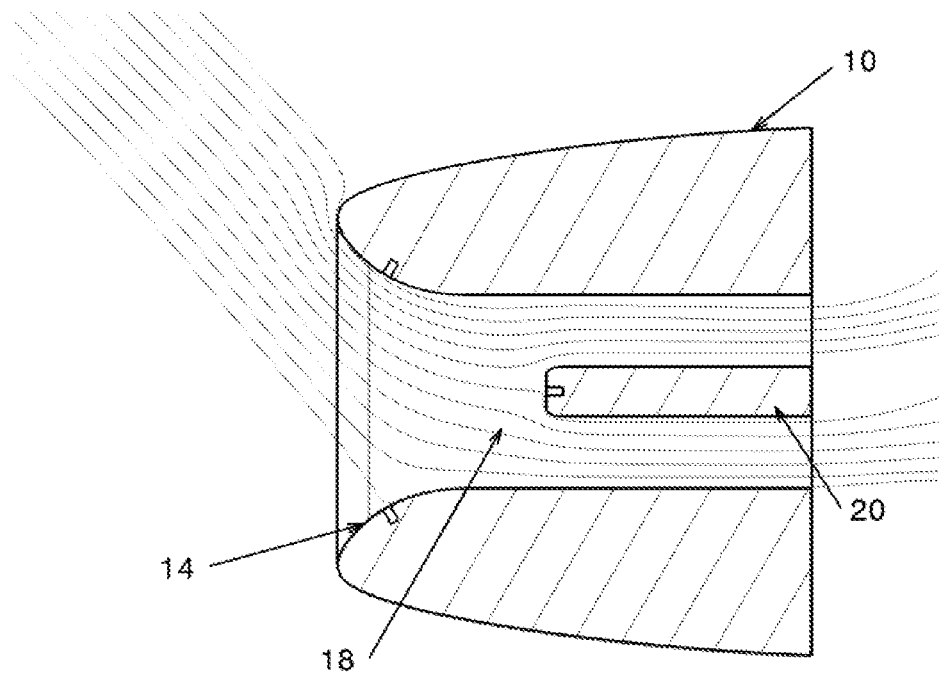
FIG. 1(b) illustrates airflow through the device of FIG. 1(a)

FIG. 1(a) illustrates an incoming airflow at a velocity V and a yaw angle α relative to the axis 16, where a is less or equal to the design onset angle. As shown in FIG. 1(b), the inlet region 14 of the channel is shaped to direct the incoming airflow so that it is aligned with the device axis 16.

Referring again to FIG. 1(a), a total pressure probe 20 is positioned at a longitudinal position within the channel so as to measure total pressure after the airflow has been directed along the axis 16 by the inlet region 14. The total pressure probe 20 includes a total pressure measurement orifice T which is located within the longitudinally-directed airflow 18. In the example of FIGS. 1(a) and 1(b), the total pressure measurement orifice T is located on the central axis 16 of the device so that the central streamline of the airflow 18 impinges on the total pressure measurement orifice T. Since the total pressure is constant along this streamline, a total pressure measurement is obtained which is insensitive to the yaw angle α of the incoming flow.

As shown in FIG. 1(a), the internal surface of the inlet 14 of the channel 12 is instrumented with two further pressure measurement orifices Y1, Y2 located at opposite sides of the inlet 14. The orifices Y1 and Y2 are positioned for measurement of the static pressure at their respective locations. As shown in FIG. 1(b), the streamlines are closer together at orifice Y1, suggesting a lower static pressure, and are farther apart at Y2, suggesting a higher static pressure. The difference between the static pressure at Y2 and the static pressure at Y1 therefore provides a measurement of yaw angle α.

As will be understood by those skilled in the art, the total pressure is the sum of the static pressure and the dynamic pressure, i.e. $P_t = P_s + P_{dyn}$. The dynamic pressure, $P_{dyn} = \frac{1}{2}\rho |V|^2$ (where $\rho$ is the fluid density and V is the fluid velocity) may thus be determined if the total pressure and static pressure are known.

As will be appreciated by those skilled in the art, the static pressure of the incoming flow may be determined based on the static pressure measurements at Y1 and Y2 using a mathematical or computational flow model. In this way, the dynamic pressure of the incoming flow may be determined. Based on the dynamic pressure and the fluid density, the speed BVI may be determined.

In this way, the device 10 allows measurement of the speed (IVI) and direction (yaw angle α) of the incoming flow.

Although the above example discussed separate measurement of the total pressure at T, and the static pressure at Y1 and Y2, this is not essential. Alternatively two differential pressure transducers may be provided to measure the differences T−Y1 and T−Y2. More specifically, the first differential pressure transducer may have first and second ports respectively connected to the pressure measurement orifice Y1 and the pressure measurement orifice T, by way of sealed ducts or flexible tubing. Similarly, the second differential pressure transducer may have first and second ports respectively connected to the pressure measurement orifice Y2 and the pressure measurement orifice T, again by way of sealed ducts or flexible tubing.

The output of the first differential pressure transducer thus provides a measure of the difference T−Y1, and the output of the second differential pressure transducer provides a measurement of the difference T−Y2. From these two differences alone, the onset yaw angle α and the dynamic pressure (and thus speed) of the incoming flow may be determined.

This may be achieved by first calibrating the device (e.g. in a wind tunnel), so as to determine a relationship between the onset yaw angle α and dynamic pressure of the incoming flow (which are known in the wind tunnel environment) and the quantities that are measured (e.g. T−Y1 and T−Y2). Later measured data can then be compared to the calibration data to determine corresponding values for the onset yaw angle α and dynamic pressure.

An example of how this may be done is as follows:
1. Obtain the pressure differences P1 and P2, where:

$P_1 = T - Y_1$ $P_2 = T - Y_2$

2. Calculate the square root of the sum of the squares of these quantities:

$P_x = \sqrt{(P_1^2 + P_2^2)}$

3. Calculate the pressure coefficient $Cp_D$ as follows:

$Cp_D = (P_1 - P_2)/P_x$

The relationship between the incoming flow angle and this quantity $Cp_D$ is closely approximated by a cubic, and is insensitive to flow velocity. By fitting a cubic to a set of calibration data (e.g. obtained in a wind tunnel, as discussed above), a function can be formed to calculate incoming flow angle from this quantity. This cubic has coefficients a, b, c, and d.

4. Calculate the incoming flow angle, α, using the calibration cubic:

$\alpha = a\, Cp_D^3 + b\, Cp_D^2 + c\, Cp_D + d$

5. From the calibration data a Cp correction factor, y, may be formulated which allows the dynamic pressure to be corrected for incoming flow angle. The form of this curve may be closely approximated by a cubic as follows, with coefficients e, f, g, and h:

$y = e\, Cp_D^3 + f\, Cp_D^2 + g\, Cp_D + h$

6. Calculate the angle-corrected characteristic pressure, $P_z$ $P_z = P_x(1-y)$ 7. The dynamic pressure is directly proportional to this characteristic pressure, so a linear function may be formulated from calibration data allowing the dynamic pressure to be calculated from the following function, with coefficient i:

$P_{DYN} = i\, P_z$

Although fitting to a cubic polynomial is described above, in some embodiments a higher order polynomial fit may be used.

It will be understood that the processing steps used to determine values for the onset yaw angle α and dynamic pressure may be carried out by the processor of a data processing apparatus. Calibration data (e.g. data representing a calibration curve) may be stored in a memory which is accessible to the processor. The processor may be configured to receive data derived from the differential pressure transducers, and to calculate values for the yaw angle α and dynamic pressure of the onset airflow in accordance with the methodology discussed above. As discussed above, the speed |V| of the onset flow may be determined based on its dynamic pressure. In this calculation a value may be assumed for the fluid density (since $P_{dyn} = \frac{1}{2}\rho|V|^2$). Alternatively, in some embodiments the fluid density ρ may be measured, as will be discussed below.

As will be understood by those skilled in the art, the fluid density ρ may be determined if the ambient static pressure and temperature are known.

In some embodiments, the device may include a gauge pressure sensor to provide an absolute measure of the total pressure at T, which then allows the ambient static pressure to be determined. Thus, the device may be arranged so that a pressure measurement orifice T for total pressure measurement is in fluid communication with the gauge pressure sensor, and also with both differential pressure transducers.

The device may further comprise a temperature sensor. As mentioned above, the fluid density ρ may be accurately determined based on the measured ambient static pressure and temperature. Once the fluid density is known, the speed |V| of the oncoming flow may be accurately determined from the dynamic pressure of the oncoming flow, $P_{dyn} = \frac{1}{2}\rho|V|^2$.

Devices according to various embodiments may be used in many applications in which it is helpful to know the speed and direction of an incoming airflow. In one innovative example, the device 10 may be mounted on a bicycle to measure the airflow as experienced by a rider during a cycle ride.

At a typical speed of 25 mph, riding on a flat piece of road with no ambient wind, the aerodynamic drag (wind resistance) will make up around 80% of the total resistance which the rider of a bicycle has to overcome. Since aerodynamic drag varies as the square of the airspeed, at 25 mph, a 5 mph headwind increases the drag by 44%. Likewise a 5 mph tailwind reduces the drag by 36%. The angle of the wind relative to the cyclist's direction of travel has a non-linear effect on the drag between a pure tailwind and a pure headwind, so knowing the relative wind angle is useful information for a cyclist.

In some embodiments, the device 10 may include a wireless communication unit for wirelessly communicating with a user device such as a user's smartphone. The wireless communication unit may receive data derived from the sensors of the device (e.g. from the first and second differential pressure transducers) and transmit it to the smartphone for processing by an app stored on the smartphone. The app may be configured to process this data in accordance with the methods discussed above to determine the relative wind angle and speed. The app may be configured to record wind speed and angle throughout a ride (e.g. recording measurements at some given frequency of measurement), allowing the cyclist to normalise their performance against ambient wind conditions on the day. Alternatively, or in addition, the app may configured to display wind speed and angle during a cycle, either periodically or in real-time, e.g. with the user's smartphone mounted to the handlebars of the bicycle.

In another example, the device itself may include one or more processors configured to receive data derived from the sensors of the device 10 (e.g. from the first and second differential pressure transducers), and a memory which stores a computer program to calculate the wind speed and direction in accordance with the methods discussed above. The processor may be configured to store recorded wind angle and speed data in a memory of the device. The device may further comprise a wireless communication unit configured to transmit calculated wind angle and speed data to a user's device for storage and/or display. For example, wind angle and speed data may be periodically sent to a user's smartphone for storage and/or display.

Alternatively, or in addition, the device 10 may be in wired or wireless communication with a bicycle computer, which may either receive wind speed and direction data calculated by one or more processors included in the device, or which alternatively may be configured to calculate the wind speed and direction data itself, for example using the methods described above.

In another embodiment, the device 10 may be used in conjunction with a bicycle power meter. The measurement information derived from the device may be used to calculate a real-time aerodynamic drag coefficient (known as "CdA"), allowing the cyclist to vary their position and see the effect on their drag, irrespective of the ambient wind. In some embodiments, the device may include a gauge pressure sensor, as described above, which may be used to measure ambient static pressure. From this, altitude from may be accurately measured, thereby further improving power measurement.

More generally, feeding the cyclist with information about the relative sources of resistance (wind, mechanical, elevation change), whether during a cycle or afterwards, may allow them to decide how to position themselves for maximum efficiency, so whether to minimise aerodynamic drag at the expense of power output, or vice versa.

Figure 1C:
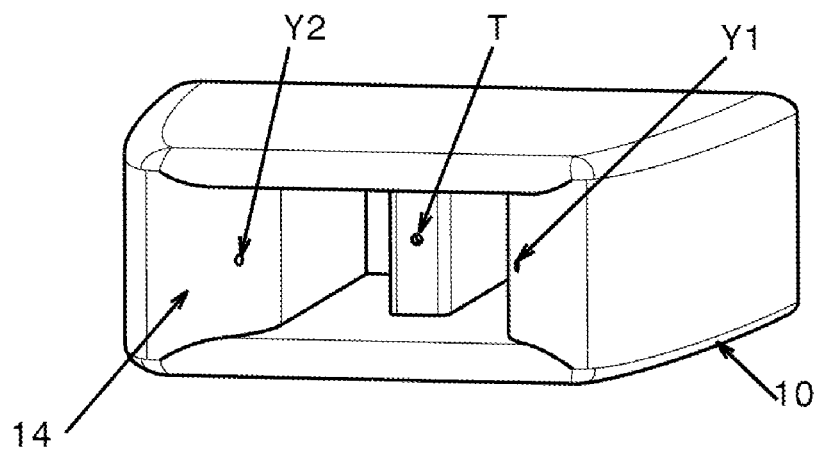
FIG. 1(c) is a perspective view of the device of FIG. 1(a) and FIG. 1(b)
Figure 2:
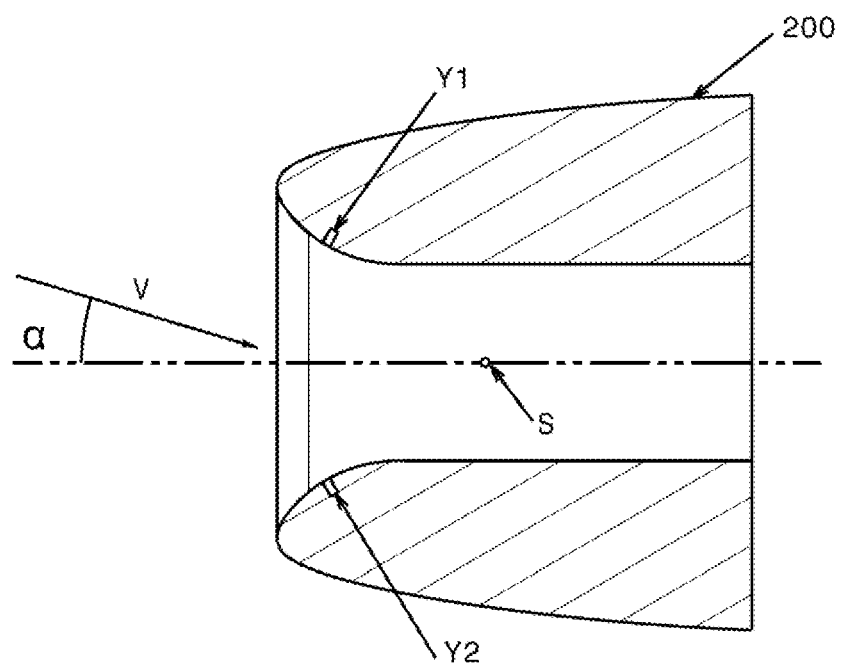
FIG. 2 is a sectional view of a device in accordance with a second embodiment.

Many modifications and variations of the device 10 are possible. For example, FIG. 2 illustrates a device 200 which is similar to the device 10 of FIG. 1, except that the total pressure probe 20 is omitted and instead a pressure measurement orifice S is provided in the wall of the channel, so that a measurement of a static rather than total pressure within the flow of air can be made. Flow angle and velocity may be determined based on the static pressure at point S and the static pressures at point Y1 and Y2. This is because these pressures are a function of incoming flow angle and speed, and thus the incoming flow angle and speed may be determined from the measured pressures by calibration. In particular, by examination of calibration data (e.g. obtained in a wind tunnel), a calibration function may be formulated to relate the pressure differences Y1-S and Y2-S to the onset yaw angle $\alpha$ and dynamic pressure. Hence, measurement of these pressure differences allows yaw angle $\alpha$ and speed $|V|$ of the onset flow to be calculated based on the calibration function.

Figure 3:
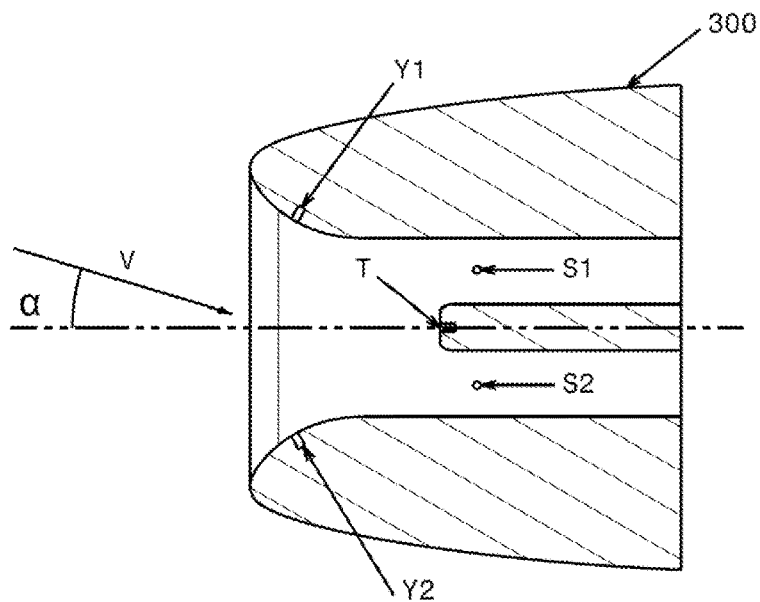
FIG. 3 is a sectional view of a device in accordance with a third embodiment.

In other embodiments both static and total pressure measurement may be used to improve measurement accuracy. This is illustrated in FIG. 3 which shows an embodiment having a total pressure measurement orifice T and two static pressure measurement orifices S1 and S2. Since the flow is accelerated within the channel, the pressure drops at points S1 and S2. By comparing pressures Y1, Y2 and T to S1 and S2 the measurement resolution may be improved. In particular, this arrangement improves accuracy of measurement of the yaw angle $\alpha$ and speed $|V|$ of the onset flow by providing a greater pressure difference, since S1 and S2 will be lower pressures than Y1 and Y2 at some angles. The extra two pressures result in an overdetermined system, but this can be used to improve resolution and accuracy.

Figure 4:
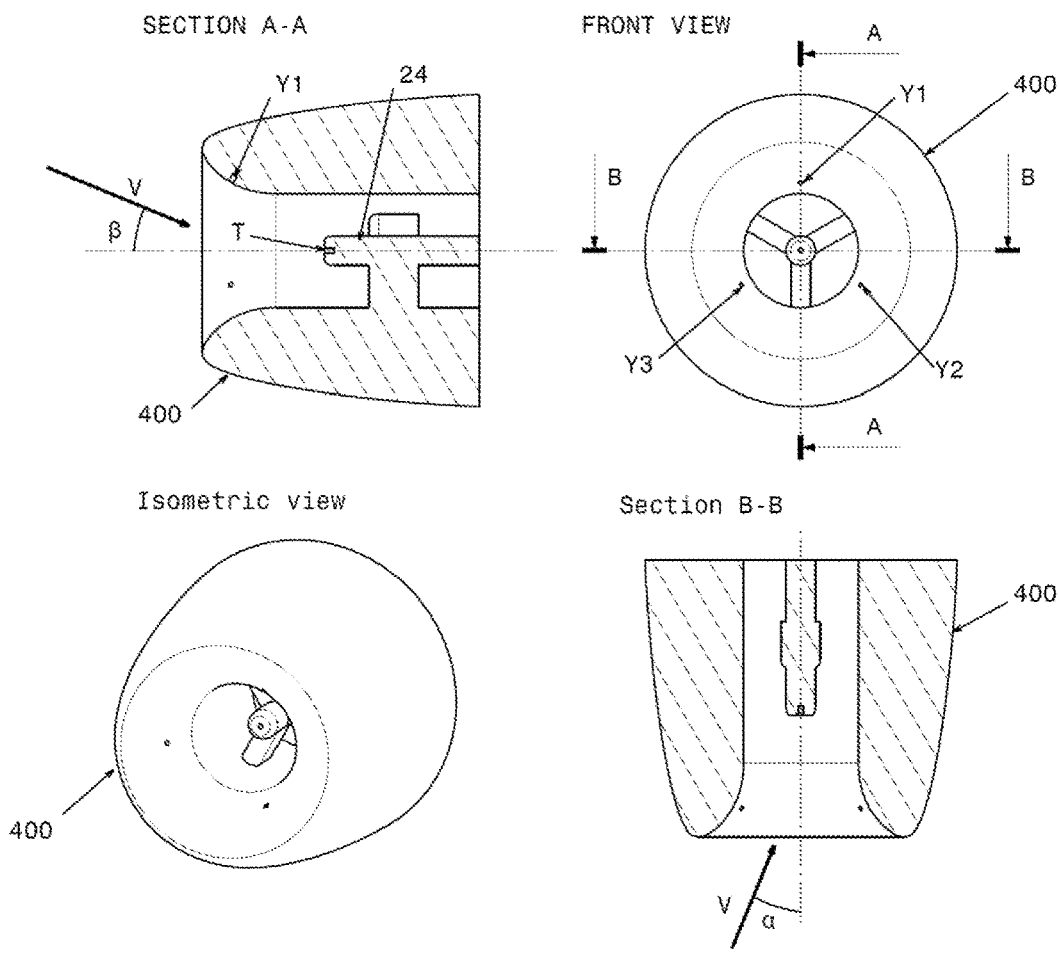
FIG. 4 illustrates a number of views of a device in accordance with a fourth embodiment.

A further embodiment of the device is shown in FIG. 4. In this example the device 400 has a revolved, asymmetric body, with three or more pressure measurement orifices Y1, Y2, Y3 arranged around the internal surface of the channel inlet, in addition to a total measurement probe 24 positioned within the channel for measurement of total pressure via pressure measurement orifice T. The skilled reader will therefore appreciate that the yaw angle ($\alpha$), pitch angle ($\beta$), and dynamic pressure (and hence, speed $|V|$), may thus be calculated in accordance with the principles and processes discussed above.

Although devices according to some embodiments may, as discussed above, be used as a flow angle/speed meter for a bicycle, various adaptations may be made for many other vehicles and/or applications. In particular, those skilled in the art will appreciate that devices in accordance with various embodiments may, inter alia, provide for:

Car/truck headwind speed and angle measurement.
Wind measurement on sail boats for sail optimisation.
Wind measurement on large container ships for fuel usage optimisation.
Angle of attack and/or yaw slip angle measurement on manned and unmanned aircraft (UAVs/drones).

The invention claimed is:

1. An airflow measurement device for use in measurement of dynamic pressure of an airflow, comprising:
   a channel having an inlet region for receiving the airflow, the inlet region being shaped to direct received airflow in a longitudinal direction with respect to the channel;
   one or more pressure measurement orifices positioned for measurement of pressure of at least part of the airflow after the airflow has been directed in the longitudinal direction with respect to the channel, by the inlet region of the channel; and
   a plurality of further pressure measurement orifices configured for measurement of static pressure at their respective locations, wherein the plurality of further pressure measurement orifices are located on an internal surface of the inlet region of the channel, wherein the plurality of further pressure measurement orifices are positioned for measurement of a direction of the received airflow.

2. The device according to claim 1, wherein one of the pressure measurement orifices is located within the channel.

3. The device according to claim 2, wherein one of the pressure measurement orifices is located centrally within the channel.

4. The device according to claim 1, wherein one of the pressure measurement orifices is configured for measurement of the total pressure of at least part of the airflow after the airflow has been directed, by the inlet region of the channel, in the longitudinal direction with respect to the channel.

5. The device according to claim 4, wherein the pressure measurement orifice configured for measurement of the total pressure comprises an opening which extends in a plane perpendicular to the longitudinal direction of the channel.

6. The device according to claim 1, further comprising one or more pressure sensors, wherein each of said one or more pressure sensors is in fluid communication with at least one of the pressure measurement orifices and/or or at least one of the further pressure measurement orifices.

7. The device according to claim 6, wherein said one or more pressure sensors comprise:
   a first differential pressure transducer for measuring a pressure difference between a pressure at a first of said plurality of further pressure measurement orifices (Y1), and a pressure at a one of the pressure measurement orifices (T), wherein the first differential pressure transducer is in fluid communication with:
   the pressure measurement orifice (T); and
   the first of said plurality of further pressure measurement orifice (Y1), and
   a second differential pressure transducer for measuring a pressure difference between a pressure at a second of said plurality of further pressure measurement orifices (Y2), and a pressure at said pressure measurement orifice (T), wherein the second differential pressure transducer is in fluid communication with:
   the pressure measurement orifice (T); and
   the second further pressure measurement orifice (Y2).

8. The device according to claim 1, further comprising a wireless communication unit adapted for wirelessly transmitting measured data to a user device.

9. The device according to claim 1, wherein the plurality of further pressure measurement orifices includes first and second further pressure measurement orifices located at opposite sides of the inlet region of the channel.

10. The device according to claim 1, comprising an axisymmetric body defining the channel.

11. The device according to claim 1, further comprising a gauge pressure sensor in fluid communication with at least one of the pressure measurement orifices and/or at least one of the further pressure measurement orifices.

12. The apparatus of claim 1
wherein the device comprises one or more pressure sensors, where each said pressure sensor is in fluid communication with at least one of the pressure measurement orifices and/or at least one of the further pressure measurement orifices;
one or more processors configured to receive data derived from said one or more pressure sensors; and
one or more computer-readable storage media comprising instructions which, when executed by the one or more processors, cause the one or more processors to process data derived from said one or more pressure sensors to determine the dynamic pressure of the received airflow.

13. The apparatus according to claim 12, wherein the one or more computer-readable storage media further comprise instructions which, when executed by the one or more processors, cause the one or more processors to determine the speed of the received airflow.

14. The apparatus according to claim 12, wherein the one or more computer-readable storage media comprise instructions which, when executed by the one or more processors, cause the one or more processors to determine the direction of the received airflow.

15. The apparatus according to claim 12, wherein the one or more computer-readable storage media comprise calibration data, and wherein processing said data derived from said one or more pressure sensors comprises determining at least one of: speed of the received airflow, direction of the received airflow, and the dynamic pressure of the received airflow, based on the calibration data.

16. The apparatus according to claim 12, wherein determining said value for the dynamic pressure of the received airflow comprises:
determining a value for a pressure coefficient (CpD) based on said data derived from said one or more pressure sensors;
determine a value for the dynamic pressure of the received airflow using the pressure coefficient and one or more calibration functions.

17. The apparatus according to claim 12, wherein determining the dynamic pressure of the received airflow comprises calculating a correction factor to correct the dynamic pressure for incoming flow angle.

18. A bicycle airflow velocity measurement device for use in measurement of dynamic pressure of an airflow, comprising:
a channel having an inlet region for receiving the airflow, the inlet region being shaped to direct received airflow in a longitudinal direction with respect to the channel;
one or more pressure measurement orifices positioned for measurement of pressure of at least part of the airflow after the airflow has been directed in the longitudinal direction with respect to the channel, by the inlet region of the channel; and
a plurality of further pressure measurement orifices configured for measurement of static pressure at their respective locations,
wherein the plurality of further pressure measurement orifices are located on an internal surface of the inlet region of the channel, wherein the plurality of further pressure measurement orifices are positioned for measurement of a direction of the received airflow.

19. A bicycle power meter apparatus for use in measurement of dynamic pressure of an airflow, comprising:
a channel having an inlet region for receiving the airflow, the inlet region being shaped to direct received airflow in a longitudinal direction with respect to the channel;
one or more pressure measurement orifices positioned for measurement of pressure of at least part of the airflow after the airflow has been directed in the longitudinal direction with respect to the channel, by the inlet region of the channel; and
a plurality of further pressure measurement orifices configured for measurement of static pressure at their respective locations,
wherein the plurality of further pressure measurement orifices are located on an internal surface of the inlet region of the channel, wherein the plurality of further pressure measurement orifices are positioned for measurement of a direction of the received airflow.

* * * * *